July 22, 1969  A. F. HOLDEN  3,456,331
METHOD FOR BRAZING ALUMINUM RADIATORS
Filed Nov. 9, 1966  2 Sheets-Sheet 1

INVENTOR
ARTEMAS F. HOLDEN
BY
ATTORNEYS

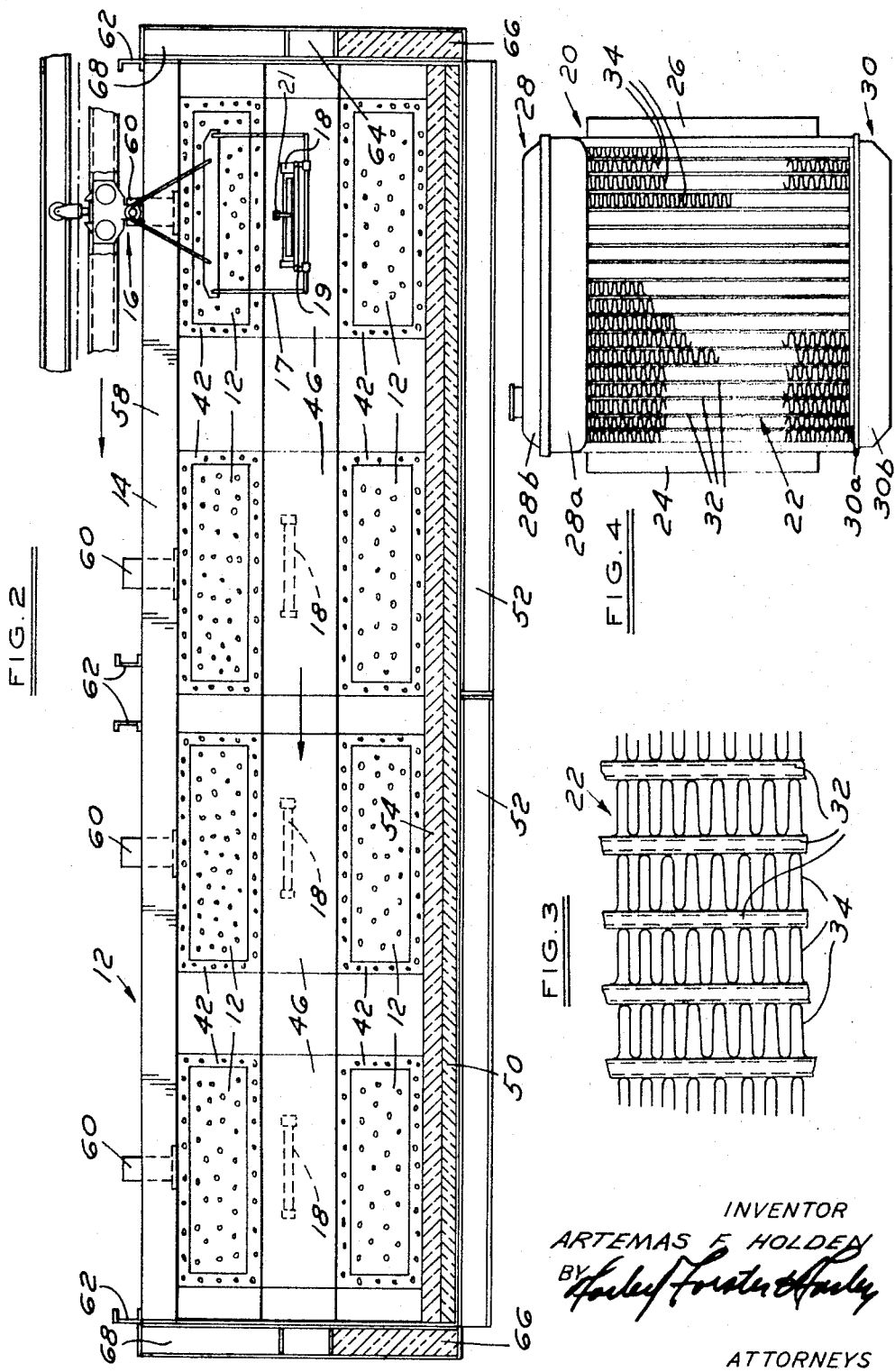

United States Patent Office 3,456,331
Patented July 22, 1969

3,456,331
METHOD FOR BRAZING ALUMINUM RADIATORS
Artemas F. Holden, 2195 S. Millford Road,
Milford, Mich. 48042
Filed Nov. 9, 1966, Ser. No. 593,091
Int. Cl. B23k *31/02;* B21d *53/00;* B23p *15/26*
U.S. Cl. 29—471.1                             6 Claims This invention relates to a method and apparatus for brazing aluminum parts and in particular for brazing heat exchanger core units for use in automotive radiators.

The heat exchanger units of automotive radiators involve complex shapes and components of different gauge materials. The presence of tubes, fins, side frames and headers makes uniform heating very difficult. This is particularly true for aluminum brazing where a flux is needed to remove the aluminum oxide coating and temperatures of 1130 degrees F. with variances of less than plus or minus 3½ degrees must be maintained.

Beacuse of the difficulty in maintaining such uniform heat and the use of different gauge materials in automotive radiators, aluminum radiators have never been successfully brazed in furnaces prior to this invention. Instead, the only accepted method has been a complicated and expensive salt bath dip-brazing process.

In the salt bath dip-brazing process, the molten flux needed to remove the oxide coating on the aluminum parts is made part of the salt in the salt bath. This is to assure removal of the aluminum oxide coating from the surface to be brazed at the instant the braze metal is molten and ready to flow into the joint. Since the aluminum oxide has a high resistance to chemical attack a very corrosive flux must be used and its consistency must be maintained. The flux is very expensive and the high rate of its evaporation from the salt bath, whether or not work is being processed, further increases the cost.

Both the flux and the carrier salts in the dip-bath are damaged and deteriorate due to contaminates normally carried into the bath with the work. This, and the high corrosive effect, makes the equipment and the process expensive to maintain and operate.

To minimize the cost to some extent, a preheated oven is often used to counter the loss of flux due to evaporation. This invention makes use of an oven for the entire brazing process and avoids all of the salt bath dip-brazing problems.

The present invention contemplates the use of an oven to provide a radiant heat transfer to the work. Since radiant heat disperses uniformly across a given space it is easier to predict the heating pattern and to arrange the proper heat transfer to all exposed surfaces which require it and to avoid those areas where undue heat creates problems.

Heretofore, it has not been common practice to furnace braze radiators with materials having differential thickness greater than 0.10. There is too much heat stored in the heavier sections and rapidly transferred by the thin walled sections All previous efforts to eccomplish brazing in furnaces have proven more expensive than copper soldering systems and have defeated the advantages of using aluminum where cost savings is a major factor.

The method and apparatus of this invention for brazing aluminum radiators makes use of radiant heat directed only to the thin wall sections. It enables accurate temperature control and a higher concentrated BTU input per unit. A better balance of heat is possible since consideration can be given heat rise in the oven. Controlled supplemental air introduced through non-firing portions of the wall can be used to avoid overheating heavy sections of the side plates and rack supports and is part of the furnace wall construction. The CO to $CO_2$ ratio may be controlled to avoid excess oxygen that would adversely affect the flux, and, venting gases are made to by-pass the work to avoid discoloration.

All of the advantages of aluminum brazing are obtained in the practice of the present invention: lower metal cost, lighter weight, better bonding, a better material supply situation, etc. The greater strength of brazing over soldering assures meeting pressure tests and the initial equipment, maintenance and material cost savings are exceptional.

Further objects and advantages in the practice of this invention will be better known and appreciated from the detailed description of a preferred method and apparatus for brazing aluminum radiators which follow and wherein reference is made to the accompanying drawings.

In the drawings:

FIGURE 2 is a cross-sectional view substantially through the centerline of the luminous wall oven or furnace and looking at an inner side wall face thereof.

FIGURE 3 is an elevational view of a part of a heat exchanger core unit for an automobile radiator.

FIGURE 4 is an elevational view of an automobile radiator showing the side rails and headers used with the heat exchanger unit of the previous drawing figure.

Figure 1:
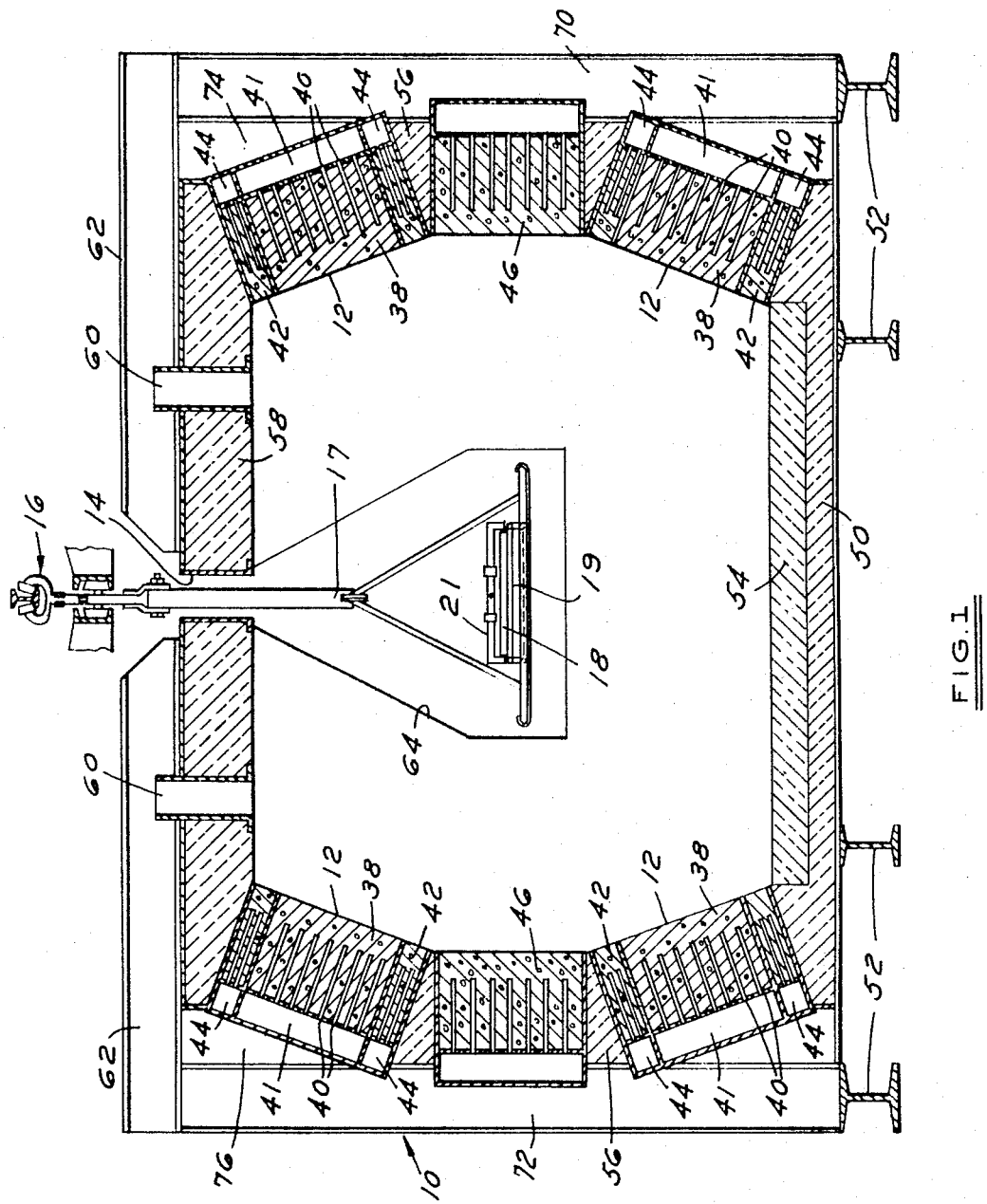
FIGURE 1 is a cross-sectional view through the luminous wall oven or furnace used in the practice of this invention.

The luminous wall oven 10 shown in the drawings, includes insulated refractory walls which have radiant heat panels 12 mounted therewithin at regular spaced intervals. The oven includes an open slot 14 extending its full length for an overhead conveyor system 16 from which individual "power and free" carries 17 are suspended each of which carries an aluminum radiator assembly 18 through the oven during the brazing operation.

The aluminum radiators 20, as shown in FIG. 4, are of conventional construction. They include the heat exchanger unit 22 with side rails 24, 26 and header tanks 28 and 30.

The heat exchanger core unit 22, includes a plurality of thin vertical tubes 32 opening at either end into the respective header tanks and having cooling fin convolutions 34 transversely thereacross for best heat transfer purposes.

All parts of the radiator are of aluminum material and the tubing 32 and fin convolution sections 34 are of a like thin wall construction. However, the side rails 24, 26 and the header tanks 28, 30 are of heavier gauge aluminum as will be appreciated in the discussion which follows.

Each carrier supports a tubular rack 19 which in turn supports the preassembled radiator side rail and header components, the side rails being also held in position by a suitable bridge clamp 21.

Referring again to the luminous wall oven 10, and in particular to FIG 1, the radiant panels 12 are porous blocks or bricks 36 which include a central heating section 38 having bored holes 40 exposed to a plenum chamber area 41 through which the combustile gas to fire the face of the panels is provided in accordance with the disclosure of my United States Patent 2,828,813.

An insulating peripheral part 42 of each heating panel is in communication with a chamber area 44 through which cooling or insulating air is provided in accordance with the disclosure in my United States Patent 3,008,513.

The radiant heat transferring panels 12 are disposed in banks in the oven which provide two panels on each side wall inclined in a manner which directs the brazing heat from the panels centrally of the oven and in particular against the upper and lower sides of a radiator carried horizontally therethrough.

To assure protection for the radiator side rails 24 and 26, the radiant panels 12 on each side of the oven are separated by a porous brick 46 through which only cooling air is emitted. These are directed at the side rails 24 and 26 to prevent them from reaching undesirably high temperatures and adversely affecting the brazing operation.

Since the header tanks 28 and 30 are carried in front and behind the radiator 20, as horizontally carried through the oven 10, and the radiant heat is directed only at the upper and lower disposed faces of the heat exchanger part of the radiator, they are not overheated. Further, it will be appreciated that the insulating air through the cooling bricks 46 flows past them in their course through the oven.

Looking at the overall oven construction in further detail, there is principally an outer bottom wall 40 supported on beams 52 and having an inner bottom wall construction 54 of refractory material. Side walls 56 are of refractory material provided between the banks of radiant panels 12 and to provide support for the panels. Overhead is a closing wall 58, which includes the access slot 14 for the conveyor system, 16 and suitable exhaust vents 60.

The top wall 58 of the oven 10 is reinforced by channel beams 62 and it will be seen in FIG. 2 that the oven includes sections of two banks of radiant panels so that it may be provided in any desired length.

The ends of the oven are closed, except for the conveyor and carrier exit 64, shown best in FIG. 1, by a suitable wall of refractory material 66 at the bottom half. The upper part at each end is closed by chamber areas 68 which are in communication with like chamber areas 70 and 72 extending the full length of each oven section and providing insulating side walls.

The cooling or insulating air for the centrally disposed porous bricks 46 and for the peripheral part 42 of each radiant panel 12 is connected to these side wall insulating chambers, as best shown in FIG. 1. Suitable access to the respective insulating or cooling air chambers of the plain bricks and panels is provided and may be as shown or otherwise.

Inside the outer insulating wall chambers 70 and 72 are provided second chamber area spaces 74 and 76, which incorporate piping, not shown, through which the gaseous fuel to plenum chambers 41 for firing the luminous panels 12 is provided.

The oven walls are of a refractory material more resistant even than metal to the flux. In addition, the air-gas mixture coming through the pores of the brick in the heating surfaces creates a continuous gas barrier between the bricks and the corrosive fluxes. Consequently, there is good containment for the high heat required without oven wall damage.

It also will be appreciated that the heat rise phenomenon may be taken into consideration by having the higher disposed radiant panels with lesser porosity than those below. Further, panels may be formed and arranged so that various surfaces on parts receive more or less heat as desired. The heating pattern is very flexible.

The radiant heat brazing process of this invention is practiced as follows:

Certain of the aluminum radiator parts to be brazed are preclad with a suitable cladding alloy such as No. 11 brazing sheet identified on page 20 of "Standards for Aluminum Metal Products 1966, Eight Edition," published by the Aluminum Association, September 1965 specifying a core material number 3003 (melting point 1200 degrees F.) and a cladding alloy No. 4343 (1120 degrees F.–1130 degrees F.); or as a second choice alternative No. 24 brazing sheet having a core material No. 6951 (melting point 1140 degrees F.–1210 degrees F.) with a cladding alloy No. 4045 (1078 degrees F.–1080 degrees F.). All parts need not be clad as long as at least one of any adjacent parts is capable of furnishing the required brazing alloy for a satisfactory joint. For example, in a typical radiator assembly to be furnace brazed, the fin convolutions 34 and upper and lower tank header sections 28a, 30a, directly connected to the tubes may be of clad material while side plates 24 and upper and lower tank assembly closures 28b, 30b, may be an unclad alloy as No. 6063 (Aluminum Association Designation).

After assembly of the radiator components, which may include the upper and lower header tanks when designed for a brazed joint, as well as the core, tube, fin and side rail elements, a suitable flux is sprayed onto the exterior surfaces of the assembly only. (This distinguishes from the salt bath brazing process wherein the flux is mixed in the salt bath, where it coats all interior as well as exterior surfaces and requires three to four times more flux material.) An example of a suitable brazing flux material is that sold by Aluminum Company of America under the trade name Alcoa Flux #53 containing sodium chloride, potassium chloride, lithium chloride, kroyalite (sodium aluminum fluoride) and potassium fluoride.

A wetting agent such as alkylaryl polyether alcohol is preferably applied to the radiator assembly at the time of spraying on the flux. The radiators 20 are carried horizontally through the oven 10. The faces of the radiant panels 12 are directed angularly upwardly and downwardly at the top and bottom surfaces of the heat exchanger part of the radiator a face angle to the vertical in the order of 20 degrees as shown being suitable. Since the radiant heat travels in straight lines it is easy to predict and set the desired heating pattern so that only those surfaces to be brazed receive the necessary heat. In the absence of a forced convection system, in the usual sense, the heat may also be more accurately controlled. Consequently, the necessary brazing temperature for the preferred aluminum cladding in the order of 1130 degrees F. is readily provided.

In a typical oven with four individually controlled heating zones as shown in FIG. 2, automobile radiators are successfully brazed with a cycle of 4½ minutes at an oven temperature of 1150 degrees F. in the first zone, 4½ min. at 1250 degrees F. in the second zone, 2 min. at 1300 degrees F. in the third zone and 1 min. at 1100 degrees F. in the fourth zone respectively.

Upon leaving the oven, the brazing is complete and the radiators are further processed by a 1 min. air-cooling, 1 min. hot water spray wash, 1 min. air blow-off, hot water submerged wash, cold water wash, chemical cleaner to remove flux, cold water rinse, nitric acid brightener bath, and final cold water wash.

The brazing operation is a one-step process. Maximum heat transfer rates consistent with uniformity are possible. The total energy cost is lower since less space and expensive power is used, as in the salt bath dip-brazing process and in forced convection ovens. Less maintenance and down-time are encountered since the oven walls are immune to attack by corrosive flux fumes and an overhead conveyor system is used. The work itself is unaffected by work previously processed and there is no contamination of the work or atmosphere in which it is processed.

While a particular preferred method and apparatus for brazing aluminum radiators has been illustrated and described in detail, it will be understood that numerous modifications in each may be resorted to without departing from the scope of the invention as defined in the following claims.

I claim:

1. The method of brazing aluminum parts together as assembled with other parts of substantially varying wall thickness, such as employed in an aluminum automotive radiator assembly, comprising precladding the aluminum material of certain of the adjacent parts to be brazed with a suitable brazing material; applying a suitable fluxing material, and subjecting parts of relatively lighter gauge wall thickness to a radiant heat source sufficient for brazing said aluminum parts while supplying cooling air adjacent parts of relatively heavy wall thickness.

2. The method of brazing an aluminum core automotive radiator including side rails and header tanks of varying thickness in comparison with the core parts to be brazed comprising precladding the aluminum material of certain of the adjacent parts to be brazed prior to assembly with a suitable brazing material, applying a suitable fluxing material, maintaining the assembled radiator in a substantially horizontal plane, and subjecting upper and lower core faces of said radiator to directional radiant heat sources directed respectively toward said core faces while providing cooling air adjacent side portions of said radiator.

3. The brazing method of claim 2 wherein the flux is applied by spraying the exterior surfaces of the assembled radiator.

4. The method of brazing aluminum components of various wall thickness in a heat exchanger including relatively lighter gauge core parts comprising precladding certain of the parts to be brazed with a suitable brazing material, applying a suitable fluxing material, subjecting said parts as assembled to a radiant heat source sufficient for brazing said aluminum parts, and directing the radiant heat of said source selectively and predominately at the relatively lighter gauge core parts of said heat exchanger while supplying cooling air adjacent to relatively heavier gauge parts of said assembly.

5. The method of brazing an aluminum core automotive radiator having rails of heavier wall thickness in comparison with the core parts to be brazed comprising precladding with a suitable brazing material certain of the parts to be brazed, locating the radiator with its main plane extending horizontally, and directing radiant heat sources toward upper and lower core faces of said radiator assembly while directing cooling air toward side portions of said radiator assembly.

6. The method of brazing an aluminum core automotive radiator having side rails of heavier wall thickness in comparison with the core parts to be brazed comprising precladding with a suitable brazing material certain of the parts to be brazed prior to assembly, applying a suitable fluxing material, moving the assembled radiator with its main plane in a horizontal position progressively in a straight line through a multizone radiant heat source, and directing the radiant heat of said source from opposite sides toward top and bottom aluminum core portions of said radiator while supplying cooling air to heavier gauge portions of said radiator.

References Cited
UNITED STATES PATENTS

| | | | |
|---|---|---|---|
| 2,294,413 | 9/1942 | Marshall. | |
| 2,414,312 | 1/1947 | Lee | 29—502 X |
| 3,046,649 | 7/1962 | Brennan | 29—498 X |
| 3,094,775 | 6/1963 | Warren | 29—498 X |
| 3,106,016 | 10/1963 | Warren | 29—498 |
| 3,370,343 | 2/1968 | Martin | 29—501 X |
| 3,375,570 | 4/1968 | Dubusker | 29—502 X |
| 3,386,152 | 6/1968 | Plegat | 29—498 X |

JOHN F. CAMPBELL, Primary Examiner

R. F. DROPKIN, Assistant Examiner

U.S. Cl. X.R.

165—120; 29—157.3, 495, 497, 498, 502, 504